INVENTORS:
Robert O. Gunderson
Tom T. Tang
By Louis A. Kline
John J. Maclagan
Murray L. Young
Their Attorneys INVENTORS:
Robert O. Gunderson
Tom T. Tang BY Louis A. Kline
John T. Matlago
Murray L. Young
Their Attorneys

Fig. 3

Table 1 / Table 2

| Decimal Equivalent | $G_4$ $F_4$ $J_4$ $2^3$ | $G_3$ $F_3$ $J_3$ $2^2$ | $G_2$ $F_2$ $J_2$ $2^1$ | $G_1$ $F_1$ $J_1$ $2^0$ | $H_4$ $Ja_4$ $2^3$ | $H_3$ $Ja_3$ $2^2$ | $H_2$ $Ja_2$ $2^1$ | $H_1$ $Ja_1$ $2^0$ |
|---|---|---|---|---|---|---|---|---|
| 0 | 0 | 0 | 0 | 0 | 0 | 1 | 1 | 0 |
| 1 | 0 | 0 | 0 | 1 | 0 | 1 | 1 | 1 |
| 2 | 0 | 0 | 1 | 0 | 1 | 0 | 0 | 0 |
| 3 | 0 | 0 | 1 | 1 | 1 | 0 | 0 | 1 |
| 4 | 0 | 1 | 0 | 0 | 1 | 0 | 1 | 0 |
| 5 | 0 | 1 | 0 | 1 | 1 | 0 | 1 | 1 |
| 6 | 0 | 1 | 1 | 0 | 1 | 1 | 0 | 0 |
| 7 | 0 | 1 | 1 | 1 | 1 | 1 | 0 | 1 |
| 8 | 1 | 0 | 0 | 0 | 1 | 1 | 1 | 0 |
| 9 | 1 | 0 | 0 | 1 | 1 | 1 | 1 | 1 |

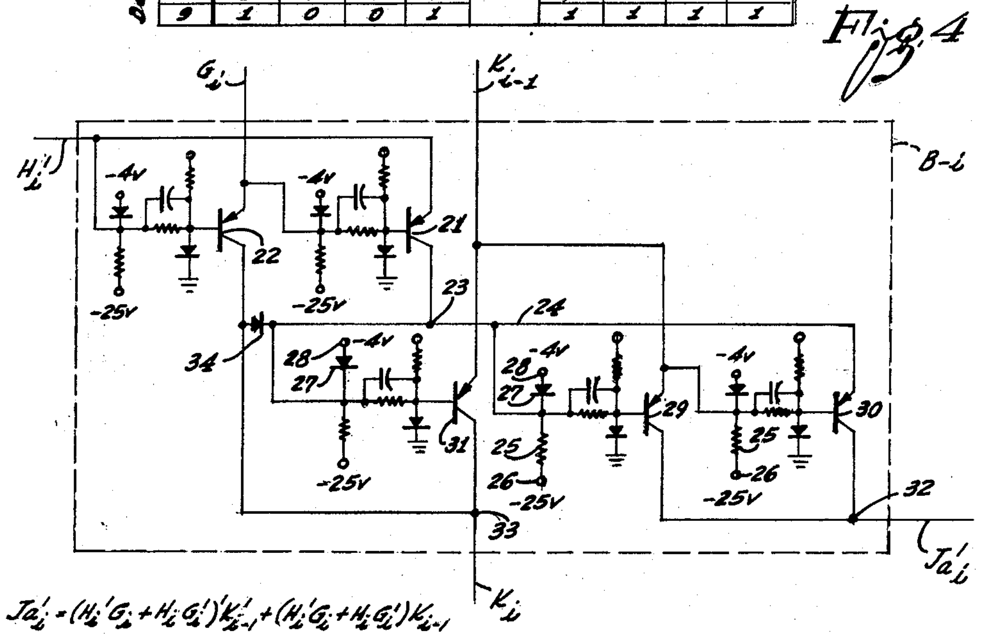

Fig. 4

$$Ja_i' = (H_i'G_i + H_iG_i')K_{i-1}' + (H_i'G_i + H_iG_i')K_{i-1}$$

$$K_i = H_iG_i + (H_i'G_i + H_iG_i')K_{i=1}$$

$K_0 = K_a$ (See Fig. 2)

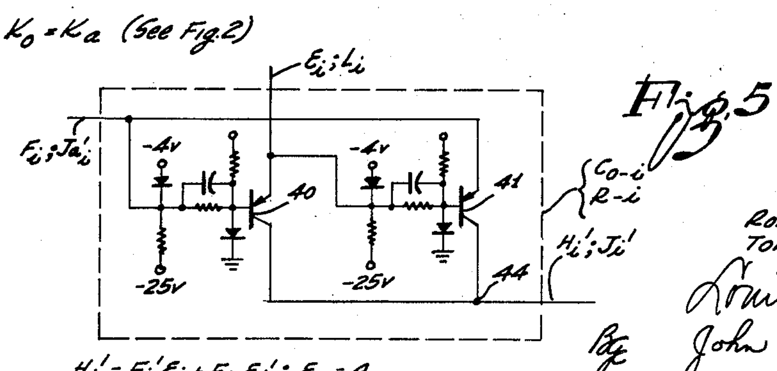

Fig. 5

$$H_i' = F_i'E_i + F_iE_i'; \quad E_1 = A_c$$

$$J_i' = Ja_i'L_i' + Ja_iL_i$$

INVENTORS:
Robert O. Gunderson
Tom T. Tang

By Louis A. Kline
John J. Matlago
Mervyn L. Young
Their Attorneys

PARALLEL CODED DIGIT ADDER

Filed April 4, 1961 6 Sheets-Sheet 4

$E_1 = A_c$ (See Fig. 2)
$E_2 = A_c D_c'$
$E_3 = F_2 A_c + A_c D_c'$
$E_4 = F_2' F_3' A_c + A_c D_c'$ $L_2 = Kr_4' D_c$
$L_3 = Ja_2 Kr_4' D_c$ (See Fig. 2)
$L_4 = Ja_2' Kr_4' D_c + Ja_3' Kr_4' D_c$

INVENTORS:
Robert O. Gunderson
Tom T. Tang
By Louis A. Kline
John J. Matlago
Myron J. Young
Their Attorneys INVENTORS:
Robert O. Gunderson
Tom T. Tang
By Louis A. Kline
John J. Matlago
Munson L. Young
Their Attorneys

PARALLEL CODED DIGIT ADDER

Filed April 4, 1961 6 Sheets-Sheet 6

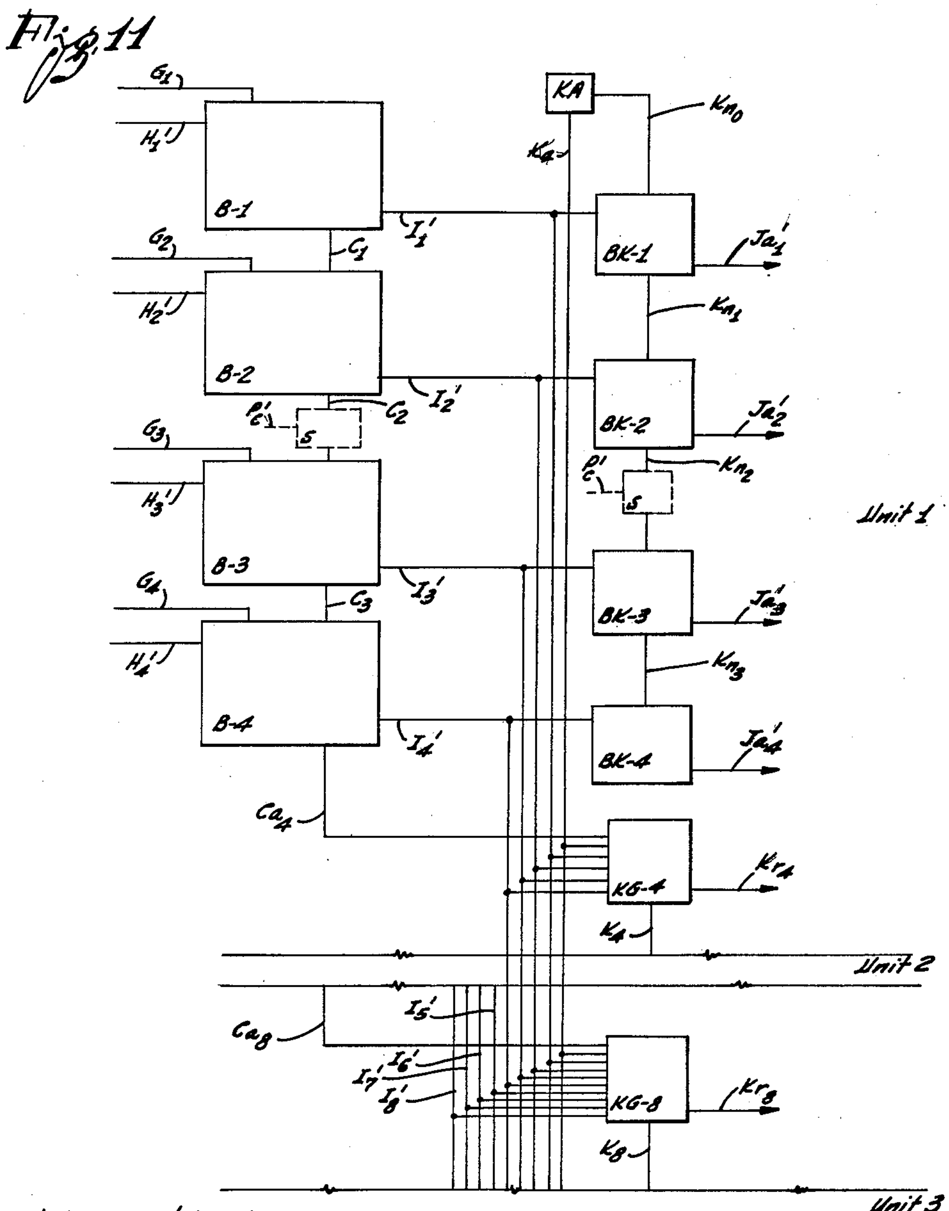

Fig. 11

$$I_i' = (H_i'G_i + H_iG_i')C_{i-1}' + (H_i'G_i + H_iG_i')C_{i-1}$$
$$C_i = H_iG_i + (H_i'G_i + H_iG_i')C_{i-1}$$
$$C_0 = C_4 = C_8 = 0$$
$$Ja_i' = I_i'Kn_{i-1}' + I_iKn_{i-1}$$
$$Kn_i = I_iKn_{i-1}$$
$$Kn_0 = Ka$$
$$K_4 = Ca_4 + I_1I_2I_3I_4K_aCa_4'$$
$$K_8 = Ca_8 + I_1I_2I_3I_4I_5I_6I_7I_8K_aCa_4'Ca_8'P_c + I_5I_6I_7I_8Ca_4Ca_8'P_c$$

INVENTORS:
Robert O. Gunderson
Tom T. Tang
By Louis A. Kline
John J. Matlago
Morgan L. Young
Their Attorneys

United States Patent Office 3,189,735
Patented June 15, 1965

3,189,735

PARALLEL CODED DIGIT ADDER

Robert O. Gunderson, Torrance, and Tom T. Tang, Los Angeles, Calif., assignors to The National Cash Register Company, Dayton, Ohio, a corporation of Maryland Filed Apr. 4, 1961, Ser. No. 100,735
9 Claims. (Cl. 235—169)

This invention relates to digital adding circuitry and more particularly to an electronic adder operating in parallel fashion on binary signals representing binary coded decimal digits.

Since persons working with electronic computers are accustomed to the use of decimal numbers, it has become the practice to design computer systems employing binary coded decimal digits, which systems must be particularly adapted to provide appropriate interunit carry signals between the particular units representative of the respective decimal digits. In the co-pending application of Walter G. Edwards, S.N. 650,275, filed April 2, 1957, and now U.S. Patent No. 2,991,009 issued July 4, 1961; there is disclosed a coded digit adder unit for adding pairs of decimal digits each represented by four binary digits. The adder unit operates by adding the binary coded signals for a pair of decimal digits in parallel, whereas the respective pairs of decimal digits are added serially. The Edwards adder employs the so-called "excess 6" code wherein the binary equivalent of the decimal digit 6 is added to one of the operands to provide the proper binary coded sum output when the decimal equivalent sum is greater than the digit 9. When the binary coded sum output has a decimal equivalent equal to or less than the digit 9, the sum is provided by a separate adder unit which does not employ the "excess 6" coding system and the proper sum is then chosen from one of these two outputs by an appropriate gating system. However, the inclusion of the additional adder units requires duplicate circuitry which inherently possesses an excessive number of components. Furthermore, with the Edwards adder unit, only one pair of binary coded decimal digits is added at a time, and it would not be possible to connect duplicate ones of such adder units to operate in parallel on the incoming pairs of binary coded decimal digits since the interunit carry signal propagation is too slow to permit such operation within the time period allocated for addition in a high speed electronic computer.

It is, therefore, a major object of this invention to provide a binary coded decimal adder circuit which carries out parallel addition during the operation period of a pair of numbers each formed by a plurality of binary coded decimal digits.

It is another object of this invention to provide a parallel binary coded digit adder which can easily be adapted to add or subtract numbers expressed in the true binary digit code or provide for the addition or subtraction of numbers expressed in the binary coded decimal digit code, or any other desirable binary code.

Still another object of the invention is the provision of a plurality of adder units so adapted that all of the interunit carry signals are concurrently generated and propagated to the next succeeding unit.

It is still another object of this invention to provide a parallel coded decimal adder circuit having improved adder stages for optimum propagation of the interstage carry signals as well as the sum outputs thereof.

Accordingly, the features of the invention reside in a plurality of parallel operated adder units each adapted to receive two sets of four binary signals representing binary coded decimal digits, each unit including means to propagate to the next succeeding unit a carry signal dependent on whether the decimal equivalent of the output sum of the two sets of signals is greater than 9. In order for the carry signal to be characteristic of this decimal equivalent, one of the pairs of four binary signals is first converted to the "excess 6" code form and the output sum from the unit in question is reconverted to a pure binary coded decimal form when such a carry signal does not appear. In order that the respective interstage carry signals are quickly propagated throughout the plurality of the adder units, an important feature of each unit circuitry is that the carry signal from the preceding unit may be transferred along an open electrical path throughout the unit, thereby requiring a minimum of delay.

Other objects of the advantages and features of the invention will be pointed out in the following description and claims and illustrated in the accompanying drawings wherein:

FIG. 3 is a tabular representation illustrating the relation between the binary coded decimal digits in Table 1 and the binary "excess 6" system of coded decimal digits as shown in Table 2;

FIG. 4 is a circuit diagram of a typical binary stage used in the adder units of the present invention;

FIG. 5 is a circuit diagram of a typical conversion stage;

FIG. 11 is a schematic diagram of a modification of the diagram in FIG. 2; and

Figure 1:
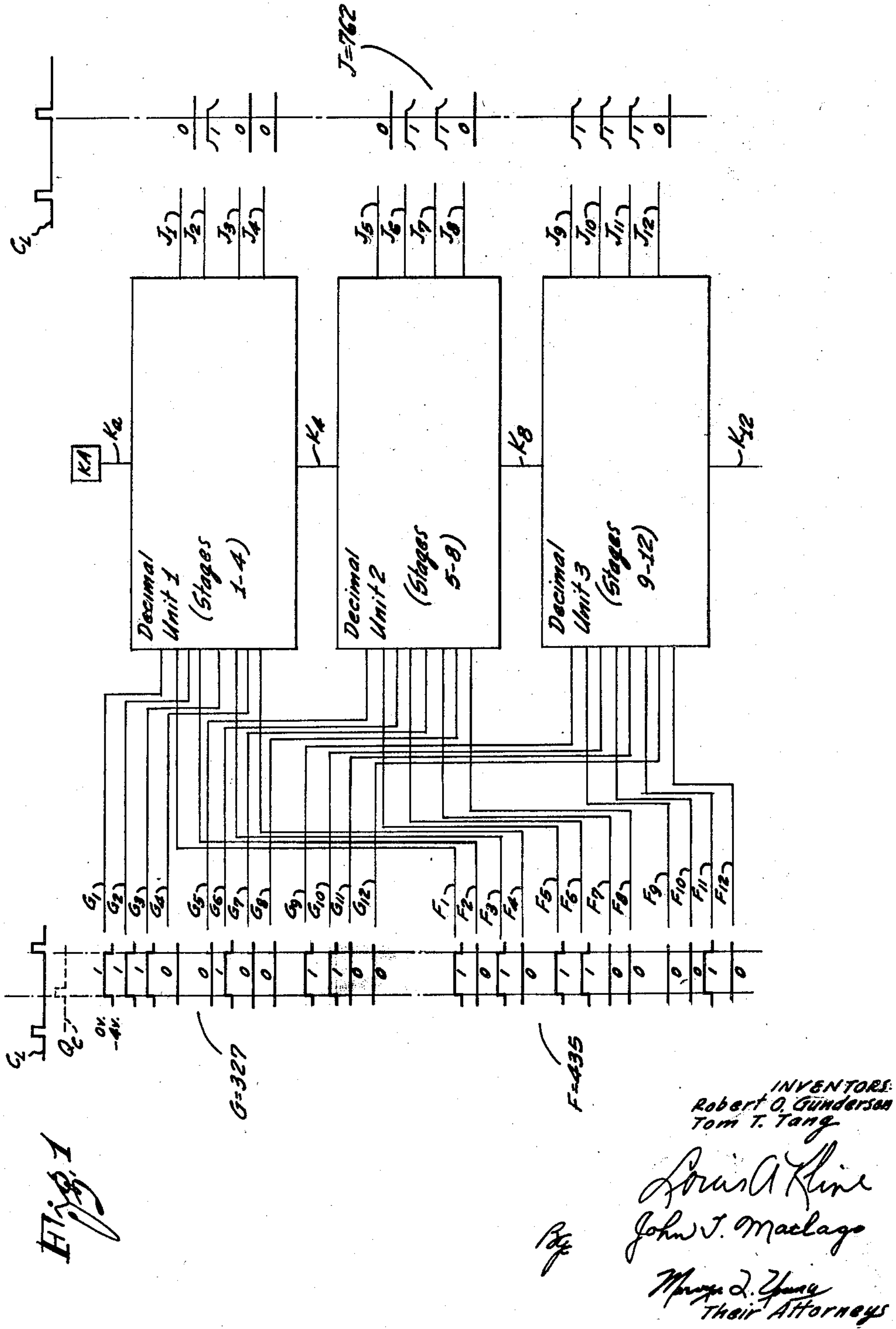
FIG. 1 is a block diagram of the adder system illustrating the arrangement of the input and output leads and the relation of the input and output signals to the clock pulse defining the operation of the adder system.

Referring now to FIG. 1, there is shown a block diagram of twelve binary stage adders arranged in a three decimal unit system for the addition of pairs of four binary digit sets of three binary coded decimal digits designated as G and F. While the embodiment in FIG. 1 is designed to receive signals representing three decimal digit numbers, larger numbers may be accommodated by the inclusion of additional units in the system, or, if desired, with the embodiment in FIG. 1, larger numbers may be broken up into groups of three decimal digits for addition in successive clock periods with the carry from each preceding group being supplied to carry flip-flop KA.

As indicated in FIG. 1, the individual binary digits are represented by high or low potential signals $G_1$–$G_{12}$ and $F_1$–$F_{12}$, respectively, where a high voltage (0 v.) represents a true logical state of a particular signal while the low voltage (−4 v.) represents the false state of the signal.

For better understanding of the "excess 6" code, there are shown, in FIG. 3, tables for conversion between the standard decimal coded binary system and the "excess 6" code. Thus, the pair of input signals, $G_1$ through $G_4$ and $F_1$ through $F_4$, will be represented by the mode indicated in Table 1 of FIG. 3 and the signals $F_1$ through $F_4$ are then converted to the "excess 6" code in the form of signals $H_1$ through $H_4$ respectively as represented in Table 2 of FIG. 3. After the addition is performed by the adder stages, the adder output sum represented by signals $Ja_1$ through $Ja_4$ will automatically be equal to signals $J_1$ through $J_4$, i.e., in the form of the straight decimal coded binary digits represented in Table 1, when this intermediate output sum is greater than 9. However, if the sum is equal to 9 or less, then the adder output signals will be representative of the form indicated in Table 2 of FIG. 3 and reconversion of the adder output sum will take place in the reconversion stages to produce final output signals $J_1$ through $J_4$. When the adder output is greater than 9, the respective signals are translated through the reconversion stages without alteration so that the final output sum is always in the straight decimal coded binary digit mode.

Since reconversion is required whenever the intermediate output sum is equal to 9 or less, that is, when there is no carry signal $K_4$ (or $K_8$) produced by the fourth (or eighth) adder stage, the reconversion of the adder output sum is made dependent upon the lack of the $K_4$ (and $K_8$) signal as will be more fully disclosed.

Figure 9:
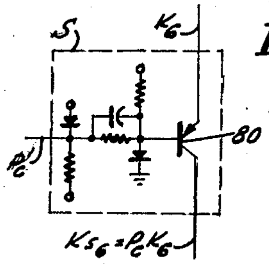
FIG. 9 is a circuit diagram of the character setup control interposed between adder stages 6 and 7.

While one of the sets of inputs will normally be converted to the "excess 6" code for addition of pairs of decimal coded binary digits, the adder system also is constructed for addition of pure binary digits, for subtraction of either binary digits or coded binary digits or for addition or subtraction of six bit alpha-numeric characters. To this end each group of four conversion stages is provided with a conversion control unit that in turn is directed by signals received from the program control outside of the adder system but in the computer of which the adder system is a part. The program control signals are three in number including an add signal (hereinafter designated as the $A_c$ signal), and a decimal signal (hereinafter designated as the $D_c$ signal). The adder system is then so designed that a low logical level (—4 v.) $A_c$ signal will set the adder for subtraction by complementing, while a low logical level (—4 v.) $D_c$ signal will set the adder for straight binary arithmetic. In addition, a character setup signal (hereinafter designated as the $P_c'$ signal) is supplied by the program control to a character setup gate between the sixth and seventh stages (see FIG. 9) of the adder when the adder is to be set for alpha-numeric operations. Also, the $D_c$ signal is supplied by the program control to the reconversion control so that no reconversion will occur when the adder is employing straight binary arithmetic.

During a particular operation of the adder of the present invention, the program control signals, will first reach a steady state condition which is maintained during the operation period. Near the beginning of this operation period, then, the inputs to the various stages of the respective adder units must also come to a steady state condition upon occurrence of a strobe pulse $Q_c$ to the memory during a memory readout operation, so that the respective output signals of the respective adder units, as well as the memory registers, which respond to the output signals of the memory registers, will have obtained their proper values in time for the logical clock pulse $C_L$ to set the respective arithmetic register to which the outputs of the adder units are supplied, or whatever other means may be used to receive the adder unit outputs. The operation of the adder may then be generally described as being asynchronous and the time period of operations then, in essence, will be only as long as required for the "worst case" transient conditions encountered in the operation. Since each adder stage reaches its steady state condition independently of the other stages except for receiving an interstage carry from the preceding stage, the "worst case" for which the system is designed is that condition in which the carry signal $K_a$ from a previous operation is to be propagated throughout all of the stages. The adder stage circuitry constructed to achieve minimum delay of this carry signal propagation will be discussed later in detail.

Figure 2:
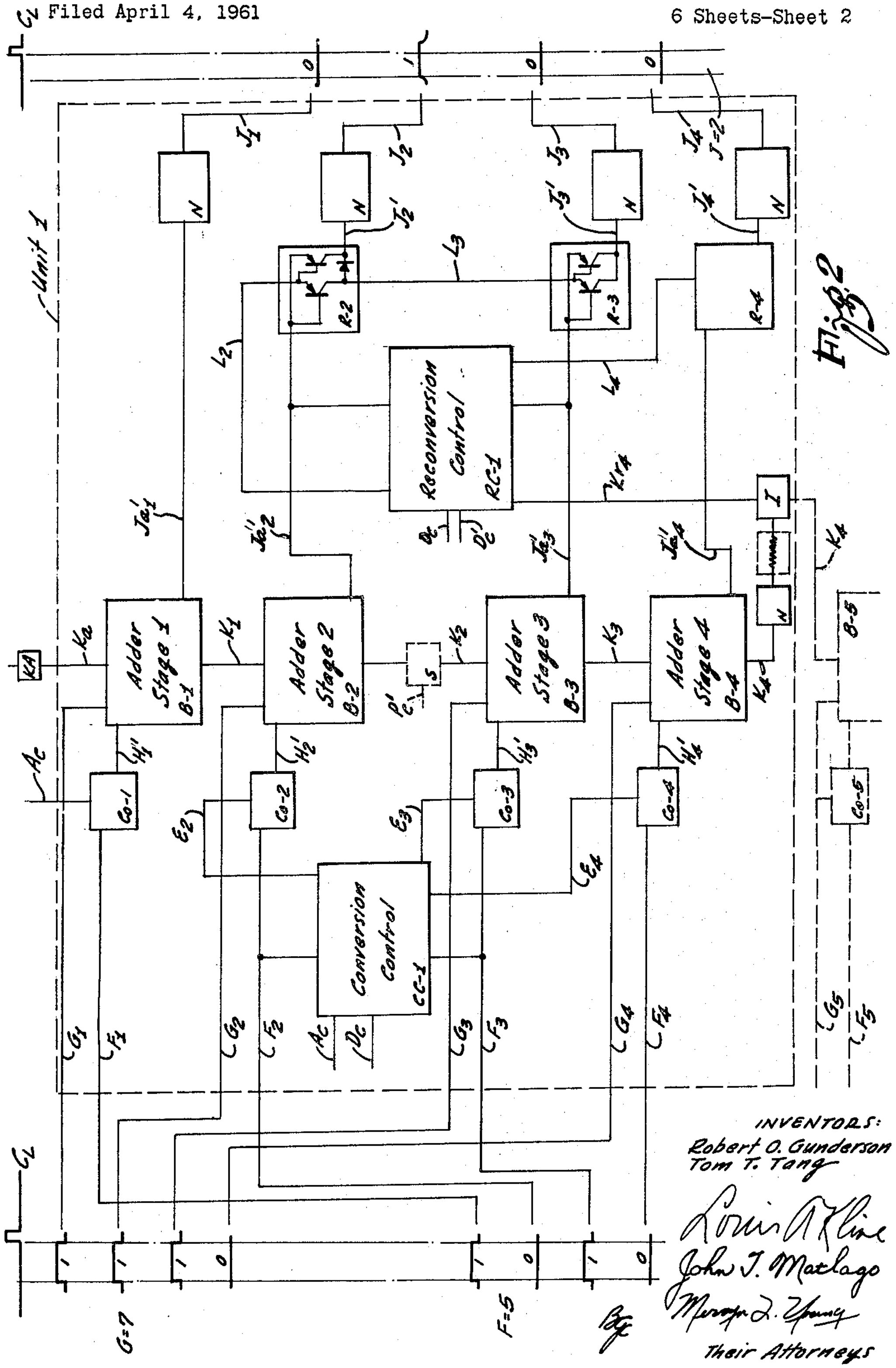
FIG. 2 is a schematic diagram of a typical individual unit group adapted to receive and add two sets of four bit binary coded decimal digits.

Referring to FIG. 2 there is shown a typical adder unit of four binary adder stages in which the input signals $F_1$ are transferred first to conversion stages Co–1 which are set in response to signals $E_1$ from conversion control CC–1 that in turn is set by the program control signals $A_c$ and $D_c$ and the input signals $F_2$ and $F_3$. The function of the conversion control will be later described. The result of the conversion, then, are the new signals $H_1'$ which in turn are transferred to the respective adder stages B–1. As will be described in detail later, the adder stages B–i combine the respective inputs, $H_1'$ and $G_1$, with the carry signals $K_{i-1}$ from the preceding stages to produce the respective interstage carries $K_1$ and the adder outputs $Ja_1'$. It will be noted from the conversion tables in FIG. 3 that $Ja_1$ is the same as $J_1$ and no reconversion is required. Similarly, it will be noted from the conversion tables in FIG. 3 that in going from the "excess 6" to the binary coded decimal code, $J_2$ is just the inverse of $Ja_2$ and this function is performed by the appropriate reconverter stage. Similar relations for $J_3$ and $J_4$ in terms of $Ja_2$, $Ja_3$, $Ja_4$ may be specified for the reconversion from the "excess 6" code to the binary coded decimal code. These conversions are performed by the respective reconverter stages in response to the appropriate signals $L_2$, $L_3$, and $L_4$ received from the reconversion control, as will be described more in detail.

Referring now to FIG. 4, the basic binary adder stage, comprised of pairs of transistors with their bases and emitters connected to form "and" combinations of an exclusive "or" expression, will first be explained. Both the adder output signal and the interstage carry signal to the next succeeding stage are generated by this circuit. It will be noted that the output signal $Ja_1'$ is the inverse of the normally required output sum due to the fact that one of the input signals, $H_1'$, received from the "excess 6" converter stage is the inverse of the normally required input $H_1$. However, the same circuit will supply the appropriate output signal $Ja_1$ when this adder stage receives the appropriate inputs $H_1$ and $G_1$.

Since each of the binary adder stages B–1 are similar, the following description will apply to each stage which includes a gating circuit composed of PNP transistors 21 and 22 that respond to the two digital input signals $H_1'$ and $G_1$. Signals $H_1'$ is supplied to both the emitter of transistor 21 and the base of the transistor 22 and signal $G_1$ is supplied to both the base of transistor 21 and the emitter of transistor 22. The collectors of the two transistors are connected to junction 23 and, in turn, through line 24 to —25 volt terminals 26 by way of "or" circuit resistors 25. Clamping diodes 27 are appropriately connected between line 24 and —4 volt terminals 28 to clamp the line 24 at the low logical level.

This part of the circuitry functions as an exclusive "or" circuit in that it combines two input binary signals to provide a "one" output only when one of the binary input signals is "one" and the other is "zero," conditions which are stated by the expression $(H_1'G_1+H_1G_1')'$. It should be noted that the gating circuit uses only the binary input signals $H_1'$ and $G_1$ without requiring separate inverted signals representing the inverses. Thus the above expression is satisfied when the input signals are different in that one input is high in potential and the other is low. It is to be noted that the two logical potential levels used in this invention are 0 and —4 volts, the 0 volt level representing a "one" or high state and the —4 volt level representing a "zero" or low state of the digital signal.

Transistors 21 and 22 each form, when conducting, one of the "and" combinations of the output sum represented by the expression $(H_1'G_1'+H_1G_1)$ which is logically equivalent to the expression in the preceding paragraph. Thus, when input signal $G_1$ is high in potential and input signal $H_1'$ is low in potential, junction 23 swings to the high logical level of 0 volts as result of current flowing from the emitter to the collector of transistor 22 and through resistors 25 to terminals 26. This high potential is indicative of the "and" combination $H_1G_1$. Likewise when input $H_1'$ is high and input $G_1$ is low in potential, transistor 21 conducts current through resistors 25 to cause junction 23 to be high which is indicative of the "and" combination $H_1'G_1'$. It should be noted that any reverse direction current is prevented from flowing through the non-conducting transistor since the base of the non-conducting transistor is connected to the high potential of the emitter of the conducting transistor. Also it should be noted that if $H_1'$ and $G_1$ are both high or are both low in potential, neither of transistors 21 or 22 is able to conduct since the emitters and bases are connected to the same potential. Under these conditions, current does not flow through resistors 25 and the low potential (−4 volt) of terminals 28 is impressed on junction 23.

This potential at junction 23 is then supplied to the circuit composed of transistors 29 and 30, to form with the previous carry signal $K_{i-1}$, the adder output sum $Ja_i'$. This potential at junction 23 as well as the previous carry signal $K_{i-1}$ and the signal from transistor 22 is also supplied to transistor 31 to form the new carry $K_i$.

It will be noted that the output circuit comprising transistors 29 and 30 is similar in function to the circuit of transistors 21 and 22 so that when the carry signal $K_{i-1}$ is high and the signal from line 24 is low, transistor 29 will produce at junction 32 a high potential indicative of the "and" combination $(H_i'G_i+H_iG_i')K_{i-1}$. Likewise, when the input signal $K_{i-1}$ is low and the potential of the signal on line 24 is high, transistor 30 will produce at junction 32 a high signal corresponding to the "and" combination $(H_i'G_i+H_iG_i')'K'_{i-1}$ and the exclusive "or" combination, for $Ja_i'$ is expressed by the equation:

$$Ja_i'=(H_i'G_i+H_iG_i')'K_{i-1}'+(H_i'G_i+H_iG_i')'K_{i-1}$$

As pointed out before, this adder output sum is the inverse of a normally required sum since one of the inputs $H_i'$ is received in inverse form and if this input were received in the form of $H_i$, the adder output would be the required expression $Ja_i$. Because of the adaptation of the adder stages to the conversion and reconversion stages, the production of this inverse form is readily useable and need not be inverted.

Of great importance is the construction of the adder stage to propagate the carry signal $K_i$ to the next succeeding stage. The resultant output to appear at junction 33 is expressed by the equation:

$$K_i=H_iG_i+(H_i'G_i+H_iG_i')K_{i-1}$$

For this purpose, the voltage signal received at junction 23 is in turn applied to the base of transistor 31 with the carry signal $K_{i-1}$ from the preceding stage being furnished to the emitter thereof to form the "and" combination of these two functions, which signal is then supplied to junction 33. The "and" combination $H_iG_i$ is received from the collector of transistor 22 as described above and supplied to junction 33. Diode 34 is provided to prevent signals at junction 23 from being transferred to junction 33. It should be pointed out that the signal received from transistor 22 is indicative of the function $H_iG_i$ as required for the carry signal expression only because it is the inverse signal designated $H_i'$ which is supplied to the base of transistor 22. That is to say, if the input signals were only representative of the terms $H_i$ and $G_i$, additional circuitry would be required to create the carry signal $K_i$. The most important characteristic of the adder circuit however is that when the base voltage of transistor 31 is at a low state, the carry signal $K_{i-1}$ is propagated completely through the adder stage with a minimum delay which would not be the case in circuitry wherein the carry signal is supplied to the base of a transistor. Because of this mode of construction, when it is required to propagate such a carry signal throughout a plurality of adder stages of the type described which stages are arranged in relation to one another as shown in FIG. 2, the respective transistors 31 will all be in a conductive state so that such a carry signal will in essence see an open electrical path throughout the system.

Figure 10:
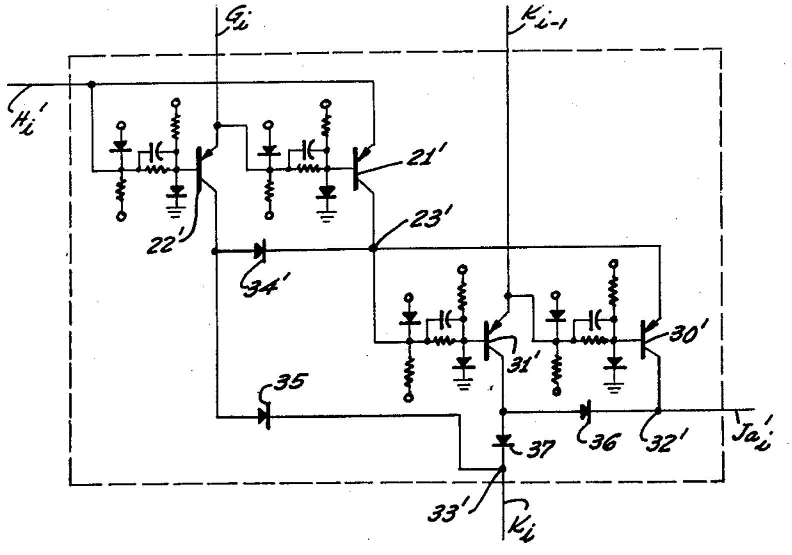
FIG. 10 is an alternative circuit of the type shown in FIG. 4.

A modification of the binary adder stage of FIG. 4 is shown in FIG. 10 wherein the transistors 31 and 29 are replaced by a single transistor 31' which is possible since transistor 29 performs the same function as transistor 31 but for different purposes. That is to say, the output signal from the transistor 29 is supplied to form a part of the signal representing the adder output, $Ja'_1$, while the output from transistor 31 is supplied to form a part of the output signal representing the carry $K_i$. The circuitry shown in FIG. 10 thus has the obvious advantage of requiring less transistors than that shown in FIG. 4. However, it will be noted that the circuitry in FIG. 10 requires the additional diodes 35, 36, and 37 where diode 35 prevents signals from transistor 31' arriving at junction 23', diode 36 prevents signals from transistor 30' arriving at junction 33' and diode 37 prevents signals from transistor 22' arriving at junction 32'. It should be noted when employing the circuitry in FIG. 10 that diode 37, as well as diodes 36 and 35, provide voltage drops which must be compensated for by providing an increased voltage swing at the next adder stage, for example.

Figure 8:
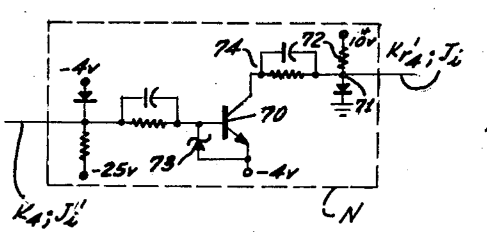
FIG. 8 is a circuit diagram of a typical logical signal inverter.

In the circuits of both FIG. 4 and FIG. 10, the voltage swings at junctions 33 and 33' are provided by the circuitry for the next additional stage. For example, in FIG. 4, the resistor 25 and −25 volt terminal 26 which is adjacent diode 27 will cooperate with transistor 31 of the previous adder stage. The voltage swing for the fourth adder stage of each adder unit is in turn supplied by the logic inverter N as shown in FIG. 8.

Figure 12:
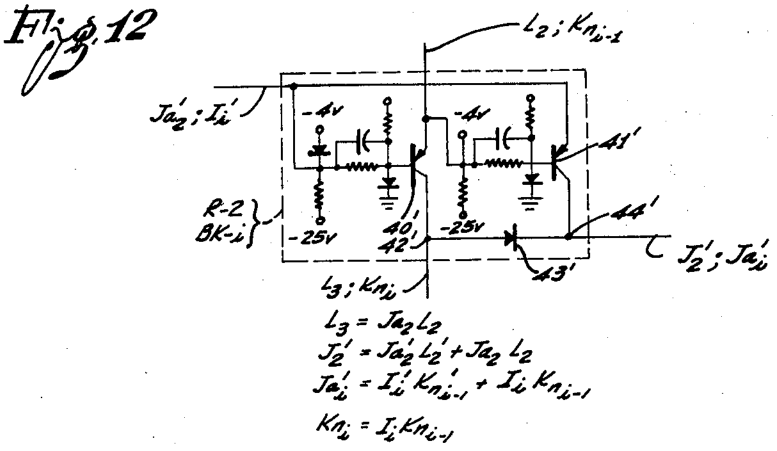
FIG. 12 is a diagram of a modification of the circuit shown in FIG. 5.

When it is desired that the adder system be adapted to receive pairs of a significantly larger number of binary coded decimal digits for addition during a single operation, the "worst case" condition, using the circuits of FIG. 4 or FIG. 10, for the propagation of carry signal $K_a$ to the last adder unit would normally require a longer time period. In order to overcome this disadvantage, there is shown in FIG. 11 a modification of the unit circuitry of FIG. 2 wherein the prior carry signal is simultaneously and separately supplied to each adder unit. In this modification, the respective binary adder stages B–1 are the same as in FIG. 2 and shown in detail in FIG. 4 and FIG. 10 (either embodiment of the adder stage may be used) with the one exception that the prior carry signal $K_a$ is not supplied to adder stage B–1. The intermediate output signals $I_i'$ of the respective adder stages, then, differ from the output signals of the adder stages in FIG. 2 in that they are independent of the prior carry signal $K_a$. Carry adder stages BK–*i* are provided to receive the output signals $I_i'$ and to incorporate therewith the prior carry signal $K_a$ to produce the required output signals $Ja_i'$ as normally produced by the adder stages in FIG. 2. The circuitry of the individual carry adder stages BK–*i* is just that of an exclusive "or" circuit as shown in FIG. 12 so that the output signal from the collector of transistor 40' in that circuit is now representative of the logical product $I_iKn_{i-1}$ where the signal representing the inverse of the former term of this product is supplied to the base of transistor 40' while the signal representing the latter term in this product is supplied to the emitter thereof. This output signal is then representative of supplemental carry $Kn_i$ to be supplied to the next succeeding carry adder stage.

Interunit carry $K_4$ to be supplied to unit 2 is to be representative of the same logical expression as is the $K_4$ signal generated by adder stage B–4 in FIG. 2. However, in the modification of FIG. 11, the carry signal $Ca_4$ received from the adder stage B–4 differs from $K_4$ in that it is not dependent on prior carry $K_a$. The relationship between $K_4$ and $Ca_4$ is given by the expression:

$$K_4=Ca_4+I_1I_2I_3I_4K_aCa_4'$$

To generate a signal representative of this expression, there is shown in block form in FIG. 11, carry generator circuit KG–4 which receives as inputs interstage carry $Ca_4$ from adder stage B–4 as well as signals representing the intermediate outputs $I_1'$. While this circuit is not shown in detail it may be of the type employing conventional diode logic to produce a signal representative of a logical "or" combination of a plurality of logical "and" arrangements. Likewise, interunit carry signal $K_3$ to be supplied to unit 3 is generated by carry generator circuit KG-8 and is a function of carry signal $Ca_8$ as received from adder stage B-8 as well as prior carry $K_a$ and the respective intermediate output signals, $I_1'$-$I_8'$. Since the intermediate outputs $I_1'$ are simultaneously generated, they are readily available for supply to the respective carry generators. The advantage of the modification shown in FIG. 11 then is that the interunit carry signal $K_3$ is supplied to unit 3 and interunit carry $K_4$ is supplied to unit 2 simultaneously with one another and shortly after the supply of prior carry $K_a$ to carry adder stage BK-1 of unit 1. Thus, it will be appreciated that an indefinite number of adder units may be employed with the prior carry signal being supplied simultaneously to each unit and the operation of such a plurality of adder units will occur within the same time interval as required for each individual unit.

Referring again to FIG. 2, the $H_1'$ signals to be supplied to the respective adder stages are received from the conversion stages Co-1 one of which exists for each adder stage. It is further noted that each typical unit as represented by circuitry of FIG. 2 includes a conversion control which supplies the appropriate control signal $E_1$ to each conversion stage Co-1 with the one exception that the first conversion stage of each unit receives its control signal directly from the program control outside of the adder system for purposes which will be described in the operation of the system.

In FIG. 5, there is shown a typical circuit of each Co-*i* stage which in essence is an exclusive "or" circuit of the type comprising transistors 21 and 22 of FIG. 4 and described in relation thereto. Thus, this circuit receives as inputs binary input signal $F_1$ and control signal $E_i$, the former signal being supplied to the base of transistor 40 and to the emitter of transistor 41 and the latter signal being supplied to the emitter transistor 40 and the base transistor 41. Therefore, the signal recived at junction 44 from transistor 40 is indicative of the "and" combination $F_i'E_i$ and the signal received from transistor 41 is representative of the "and" combination $F_iE_i'$ with the resultant output signal representing the exclusive "or" expression:

$$H_i'=F_i'E_i+F_iE_i'$$

In order to perform the appropriate conversion to the "excess 6" code, the above expression is then in essence a function of the respective signals $E_i$. Thus, for conversion stage Co-1, the appropriate control signal is add signal $A_c$ as received from the program control outside the adder system (as are the respective signals $E_5$ and $E_9$). The significance of this control signal is that the presence of the add signal $A_c$ will produce as an output of this stage the signal $H_1'=F_1'$, that is, a mere translation of the input signal $F_1$ as indicated in the conversion tables of FIG. 3 for the conversion from $F_1$ to $H_1$. Likewise, the absence of the high logical voltage level for add signal $A_c$ will effect the output of the conversion stage Co-1 to be $H_1'=F_1$, that is the $F_1$ signal will be inverted as required for subtraction by complementing as will be described in regard to the operation of the system.

Similarly, in order to perform the proper conversions represented in FIG. 3, the control signal $E_2$ (as well as signals $E_6$ and $E_{10}$) is representative of the "and" combination $A_cD_c'$. That is to say, the presence of add signal $A_c$ and decimal signal $D_c$ will cause converter stage Co-2 to produce the output signal $H_2'=F_2$ as required by the conversion tables in FIG. 3. Likewise, the lack of add signal $A_c$ will result in the inversion of the $F_2$ input as required for subtraction by complementing while the presence of add signal $A_c$ and the absence of the high logical voltage level of decimal signal $D_c$ will result in an output signal from conversion stage Co-2 representative of the expression $H_2'=F_2'$ which is just the required transfer of the $F_2$ signal as required for pure binary addition.

Similarly, control signal $E_3$ represents the function $F_2A_c+A_cD_c'$ (and the signals $E_7$ and $E_{11}$ will represent corresponding expressions). And the control signal $E_4$ represents the expression $F_2'F_3'A_c+A_cD_c'$ as required for the respective conversions of $F_4$ for the addition and subtraction of both binary coded decimal digits and pure binary digits. ($E_8$ and $E_{12}$ will have correspondingly similar expressions.)

Figure 6:
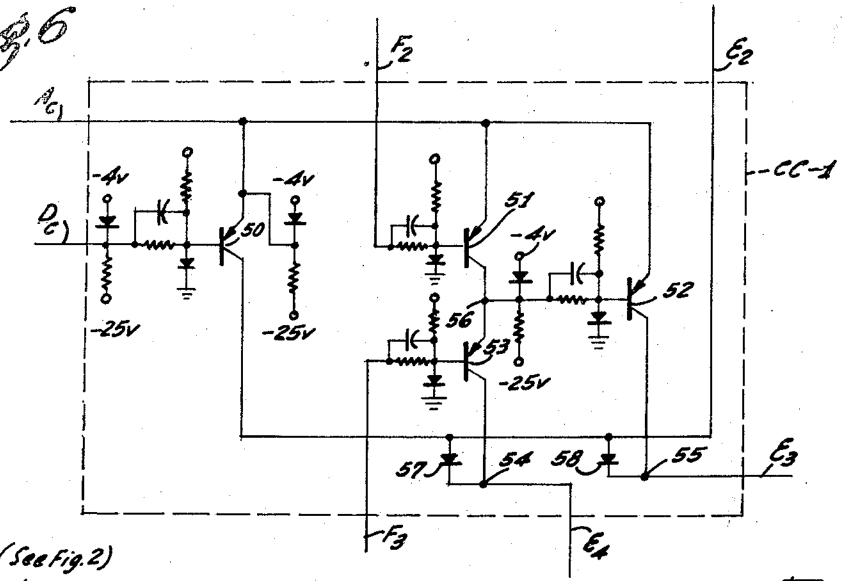
FIG. 6 is a circuit diagram of a conversion control.

As explained above, the control signal $E_1$ (equal to $A_c$) is received directly from the program control outside the adder system. The respective control signals $E_2$, $E_3$, and $E_4$, however are provided by the conversion control CC-1 as shown in FIG. 6 which receives the input signals $F_2$ and $F_3$ as well as add signal $A_c$ and decimal signal $D_c$ as indicated in FIG. 2. In FIG. 6, add signal $A_c$ is supplied to the emitter of transistor 50 as well as to the emitters of transistors 51 and 52 and decimal signal $D_c$ is supplied to the base of transistor 50 such that the output signal of transistor 50 is representative of the "and" combination $A_cD_c'$ which is the appropriate control signal $E_2$. The input signals $F_2$ and $F_3$ are supplied respectively to the bases of transistors 51 and 53 so that the output signal from transistor 51, as received at junction 56 and at the emitter of transistor 53, is representative of the "and" combination $F_2'A_c$ and therefore the output signal of transistor 53 as received at junction 54 is representative of the "and" combination $F_2'F_3'A_c$. The output signal from transistor 50 is also supplied through diode 57 to junction 54 to produce the required signal representative of the control signal $E_4$. The purpose of diode 57 is to prevent the signal from transistor 53 from entering the ouput lead carrying the control signal $E_2$.

Since the signals supplied to the base of transistor 52 are representative of the expression $F_2'A_c$, the output from transistor 52 as received at junction 55 will be representative of the "and" combination, $(F_2'A_c)'A_c$, which logically reduces to the expression $F_2A_c$. The output signal from transistor 50 is also supplied through diode 58 to junction 55 to generate the appropriate control signal $E_3$. The purpose of diode 58 is to prevent signals produced by transistor 52 from entering the output lead representing the control signal $E_2$.

After the respective inputs have been combined to form the output $Ja_i'$ from the adder stages, which signals are still representative of the "excess 6" code, reconversion of the signals to represent binary coded decimal digits is required whenever the sum represented by the signals has a decimal equivalent of 9 or less. To this end, there is shown in FIG. 2 a series of reconversion stages R-2, R-3, and R-4 for receiving and reconverting the respective outputs of the corresponding adder stages in dependence upon control signals $L_2$, $L_3$, and $L_4$ received from reconversion control RC-1. Similar reconversion stages will also be employed for the respective adder stages B-6 through B-8 and B-10 through B-12. It will be noted that no reconversion is required for adder output $Ja_1'$ (as well as $Ja_5'$ and $Ja_9'$) as illustrated in the conversion tables of FIG. 3. Each of reconversion stages R-*i* is similar in nature to the conversion stages Co-*i* exemplified by the circuit shown in FIG. 5 and the corresponding operations are similar. That is to say, the output from transistor 40 will be representative of the "and" combination $Ja_iL_1$ while the output from transistor 41 will be representative of the "and" combination $Ja_i'L_i'$ with the output from the stage being represented by the expression $J_i'=Ja_i'L_i'+Ja_iL_i$.

It will be noted in FIG. 2 that the lead supplying the control signal $L_3$ to the reconversion stage R-3 is taken from reconversion stage R–2 for reasons which will be explained later. Accordingly, there is shown in FIG. 12, a modification of the typical reconversion stage for the case of reconversion stage R–2 (and corresponding reconversion stages R–6 and R–10). In this modification, the output signal from transistor 40' which appears at junction 42' is supplied to the control lead $L_3$. Diode 43' is provided to prevent the output signal produced by transistor 41' from also appearing at junction 42'.

Since the reconversion from the "excess 6" code to the binary coded decimal form is to occur when the output sum is representative of a decimal equivalent of 9 or less, the reconversion is then determined by the lack of a carry signal $K_4$ from adder stage B–4 and also upon the presence of decimal signal $D_c$ from the program control, that is, there will not be a reconversion whenever straight binary addition has been performed. As will be noted in FIG. 3, in regard to the reconversion, $J_2$ is the inverse of $Ja_2$ and thus reconversion stage R–2 will provide the correct reconversion when $L_2$ equals $Kr_4'D_c$ and wherein $Kr_4=K_4$. Stated specifically, when there is no carry signal $Kr_4$ but there does exist a decimal signal $D_c$, $L_2$ will equal one (1), $L_2'$ will equal zero (0) and the output $J_2'$ of reconversion stage R–2 will just be equal to $Ja_2$. Similarly, the control signal $L_3$ is to be representative of the "and" combination $Ja_2Kr_4'D_c$ and the control signal $L_4$ is to be representative of the expression $$Ja_2'Kr_4'D_c+Ja_3'Kr_4'D_c$$

Figure 7:
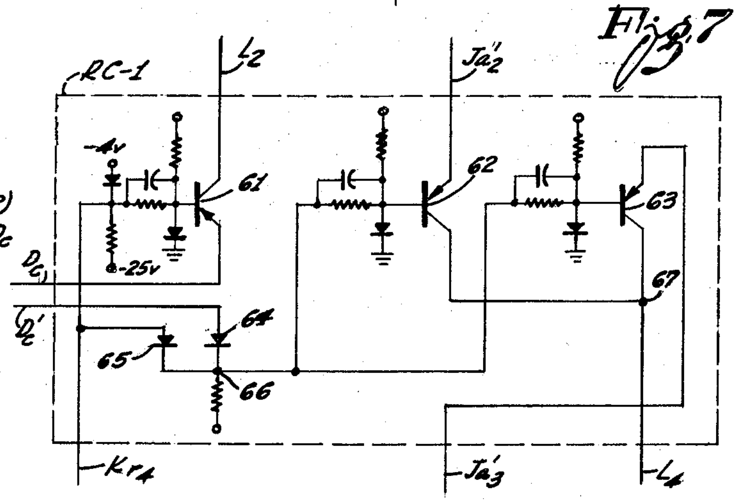
FIG. 7 is a circuit diagram of the reconversion control.

In FIG. 7 there is shown a circuitry for the reconversion control which mechanizes the respective logic expressions for the control signals $L_2$ and $L_4$. The control signal $L_2$ is received from the collector of transistor 61 wherein the carry signal $K_4$ is received from adder stage B–4 and supplied to the base of transistor 61 while decimal signal $D_c$ is received from the program control and supplied to the emitter of transistor 61 such that the output signal $L_2$ is representative of the "and" combination $Kr_4'D_c$ as indicated above. To form the control signal $L_4$, the inverse of the decimal signal (that is $D_c'$) is supplied to junction 66 by way of diode 64 while carry signal $Kr_4$ is supplied to junction 66 through diode 65 wherein diodes 64 and 65 are a standard diode logic configuration with the signal appearing at junction 66 being representative of the logical "or" combination, $Kr_4+D_c'$, which is equivalent to the expression $(Kr_4'D_c)'$. This signal is in turn supplied to the base of transistor 62 and the base of transistor 63. The signal representative of $Ja_2'$ is supplied to the emitter of transistor 62 while signal $Ja_3'$ is supplied to the emitter of transistor 63 so that the output from the collector of transistor 62 is representative of the "and" combination, $Ja_3'Kr_4'D_c$, while the output signal from the collector of transistor 63 is representative of the "and" combination $Ja_2'Kr_4'D_c$, with each of such output signals being supplied to junction 67 so that the output therefrom, $L_4$, is representative of the logical expression, $L_4=Ja_2'Kr_4'D_c+Ja_3'Kr_4'D_c$, as indicated above. Since the control signal $L_3$ is just taken as the output from the collector of transistor 40 for reconversion stage $R_2$, this signal will be representative of the "and" combination $Ja_2Kr_4'D_c$ as indicated above.

In the circuitry so far described, the transistors have been of the PNP type and in each case the individual transistor has been employed to produce "and" combinations, the logical significance of which is dependent upon whether the output was at a high voltage level (0 v.) or a low voltage level (−4 v.). In each case then, as was disclosed in the description of the adder stage as shown in FIG. 4, the collector of the transistor is biased through a blocking diode by a −4 voltage level and connected through an appropriately chosen resistor to a −25 voltage level to produce the appropriate voltage swing. In each case, the appropriate biasing components will be found either in the circuitry of the particular stage as described above or else in the next succeeding stage again in a manner similar to that discussed in regard to the adder stages.

There is one situation however in which such PNP transistors are not employed and that is the case of the inverter-power supply stages N, five of which are employed in the adder unit circuit shown in FIG. 2. Four of the N stages are provided, one for each of the output leads to invert the signals representing the respective $J_1'$ so that the final output is the respective $J_1$. It will be noted in FIG. 2 that the fifth N stage is provided to receive the carry signal $K_4$ from adder stage B–4 primarily to amplify this carry signal current. Since the stage also inverts the signal, additional inverter stage I is provided to receive the current from this N stage to supply the appropriate $Kr_4$ signal to the reconversion control $RC_1$ as well as to the first adder stage of the next suceeding adder unit. The particular circuit of the respective N stages is shown in FIG. 8 and includes NPN transistor 70. The emitter of transistor 70 is supplied with a −4 voltage and the collector thereof is connected through resistor-capacitor network 74 to junction 71 to which 10 volts is supplied through resistor 72. The input signals representing $K_4$ or $J_1'$ are supplied to the base of transistor 70 which is also connected through diode 73 to a −4 voltage supply. A high signal (zero volts) representing either $K_4$ or $J_1'$ when received by the base of transistor 70 will cause the transistor to conduct and in response thereto junction 71 will drop from a high voltage level (zero volts) thereby producing a low voltage output representative of the inverses of the inputs, that is $Kr_4'$ or $J_1$.

While the discussion of the respective circuits has been made with reference to the adder and conversion stages B–1 through B–4 of unit one, the same description will be representative of the circuitry of unit 2 representing stages B–5 through B–8 and unit 3 representing stages B–9 through B–12. However, the circuitry of unit 2 will differ in one respect. When it is desired that the adder system utilize 6 bit characters representing an alpha-numeric code it becomes necessary to block the carry signal between adder stages B–6 and B–7 which are similar to adder stages B–2 and B–3 in FIG. 2. To this end, there is inserted character fix-up circuit S, which is indicated in FIG. 2 in dashed block form, between adder stages B–6 and B–7, which circuit is shown in detail in FIG. 9 and includes PNP transistor 80 the base of which is adapted to receive character signal $P_c'$ from the program control such that the presence of a high voltage (0 v.) will cause transistor 80 not to conduct and the lack of which signal will leave transistor 80 open for conduction of the inner stage carry as required with binary coded decimal operation.

Depending upon the signals $A_c$, $D_c$ and $P_c'$ received from the program control, the adder system thus described can perform the appropriate addition or subtraction of binary coded decimal digits, pure binary digits or 6 bit alpha-numeric characters and the system is so constructed as to receive 2 sets of 12 or more binary signals representing any one of the above mentioned coded forms for parallel operation in an asynchronous manner. When the various transistors, diodes and other electrical components employed are of a type now commercially available, the system herein described can perform its complete operation during a time interval of approximately 0.7 micro-second.

When addition of 2 binary coded decimal digits is required, one set of digits is first converted to the "excess 6" code by the conversion stages in response to add signal $A_c$ and decimal signal $D_c$ received from the program control. This converted form together with the other digit signals is supplied then to the adder stages for binary addition and when each set of 4 output signals is representative of a decimal equivalent sum greater than 9, a carry signal is produced, the absence of which will cause reconversion from the "excess 6" form to standard binary coded decimal form. For example, in FIG. 2, there are shown input signals for $G=7$ and $F=5$ where the signals represent binary coded decimal digits, add signal $A_c$ and decimal signal $D_c$ being received from the program control (there being no carry signal $K_a$). The conversion stages $Co$-1 will be set to convert the respective input signals $F_1$ (0101) to "excess 6" code and the resultant $H_1$ (1011) will be supplied in inverted form $H_1'$ (0100) to adder stages B-1 along with input signals $G_1$ (0111). The intermediate output signals then represent the inverse form $Ja_1'$ (1101) and there will be a carry out signal $K_4=Kr_4=1$. Thus the $Ja_1'$ signals will be translated without change through the reconversion stages R-$i$ and inverted by the respective inverters N to produce the final output $J_1$ (0010), that is, the sum of the inputs G and F is $J=2$ with a carry signal $K_4=1$ transmitted to unit 2.

When subtraction is desired, the conversion stages will invert the input signals representing the subtrahend for subtraction by the addition of the complement thereof and the required additional digit, one (1), will be supplied by the carry source KA, the various operations being in response to the absence of an add signal $A_c$ from the program control. Should the subtrahend be less than the minuend for a given pair of binary coded decimal digits, the added output $Ja_1$ will be correctly representative of the difference and a carry signal will be produced to allow the reconversion stages R-$i$ to translate the output without reconversion. Should the subtrahend be greater than the minuend, however, the adder output $Ja_1$ will be represented in "excess 6" code and a carry signal is not produced so that reconversion of this output is effected in the reconversion stages and the final output $J_1$ will properly be in straight binary coded digit form. Since reconversion is also dependent on the presence of decimal signal $D_c$, the lack of this signal will set the reconversion stages to translate the adder output as required for binary subtraction.

When add signal $A_c$, but not decimal signal $D_c$, is supplied by the program control, the system will then provide for pure binary addition and no reconversion will be required. And when an alpha-numeric operation is desired, an appropriate character setup signal $P_c'$ will be supplied to block the carry signal between respective adder stages B-6 and B-7 with the resultant operations being similar to that described above.

By employing controlled conversion to "excess 6" code of the addend or inversion of the subtrahend before the arithmetic operation, and then reconverting after the arithmetic operation when no carry signal is generated for the next adder unit, the present invention embodies a unique system for both addition and subtraction of binary coded decimal digits as well as binary numbers and alpha-numeric characters. Furthermore, the system requires but a single set of adder units to perform the respective operations which set may nevertheless include an unlimited number of such units without requiring an increased operational time period.

While the form of the invention shown and described herein is adapted to fulfill the objects primarily stated, it is to be understood that it is not intended to confine the invention to the particular embodiments disclosed herein, for it is adaptable to embodiments in various other forms.

What is claimed is:

1. An adder circuit for adding a first number comprised of a plurality of coded digits to a second number comprised of a plurality of coded digits wherein each coded digit is comprised of a plurality of binary digits and wherein said adder circuit is to add both the coded digits and binary digits in parallel, said adder circuit comprising a plurality of first sets and a plurality of second sets of signal input lines, each of said sets including at least four of said input lines and adapted to receive thereon a respective one of a concurrent plurality of first sets and plurality of second sets of four binary signals per set respectively representing a plurality of first digits and a plurality of second digits in a first code system; a plurality of coding means for converting said concurrent first sets of binary signals on said first sets of input lines into special coded sets of concurrent binary signals representing said plurality of first digits in a second code system; a plurality of simultaneously operable adder units for concurrently receiving the respective second sets and special coded first sets of signals, said units being responsive thereto to concurrently produce a plurality of sets of output signals representing in either said first code system or said second code system the sum of the plurality of first digits and the plurality of second digits; and a plurality of decoding means for respectively receiving said sets of output signals for selective conversion of said output signals to represent said sum in said first code system.

2. An adder circuit according to claim 1 including initial carry means for concurrently supplying an initial carry signal to each of said adder units.

3. An adder circuit according to claim 1 wherein each adder unit comprises a plurality of simultaneously operable binary adder stages, each binary adder stage comprising a first transistor exclusive "or" gating circuit including: a first transistor and second transistor each having a base electrode, an emitter electrode, and a collector electrode; a common resistor connecting the collectors of both said transistors to a potential source; a common output lead connected to said collectors; means whereby the binary signals representing the adder input signals are applied to the emitters and bases of said transistors to enable only one of the transistors to conduct through said resistor at a time; a prior carry input line; a similar exclusive "or" gating circuit adapted to receive a signal on said prior carry line and a signal on said common output lead; a carry signal output lead; and a carry generator transistor having a base electrode connected to respond to the logical signal generated on only one of the collectors in said first exclusive "or" gating circuit and having an emitter electrode connected to said prior carry line, the collector of said carry generator transistor being connected to a carry output lead; whereby the output of said similar exclusive "or" gating circuit is representative of the binary sum of said adder input signals and the signals on said carry output lead is an inter stage carry signal.

4. A binary adder stage comprised of an exclusive "or" gating circuit, said gating circuit including: a first transistor and second transistor each having a base electrode, an emitter electrode and collector electrode; a common resistor connecting the collectors of both said transistors to a potential source; a common output lead connected to said collectors; means whereby the binary signals representing the adder input signals are applied to the emitters and bases of said transistors to enable only one of the transistors to conduct through said resistor at a time; a prior carry input line; a similar exclusive "or" gating circuit adapted to receive a signal on said prior carry line and a signal on said common output lead; a carry signal output lead; and a carry generator transistor having a base electrode connected to respond to the logical signal generated on only one of the collectors in said first exclusive "or" gating circuit and having an emitter electrode connected to said prior carry line, the collector of said carry generator transistor being connected to a carry output lead; whereby the output of said similar exclusive "or" gating circuit is representative of the binary sum of said adder input signals and the signals on said carry output lead is an interstage carry signal.

5. A circuit for adding a first number comprised of a plurality of binary coded decimal digits to a second number comprised of a plurality of binary coded decimal digits whereby both the decimal and binary digits are added in parallel, said circuit comprising: a plurality of simultaneously operable adder units, there being one adder unit for each respective pair of binary coded decimal digits to be added, means for applying corresponding pairs of the binary coded decimal digits which are to be added to respective ones of said adder units, means for converting the binary coded decimal digits of one of said numbers to "excess 6" binary coded decimal form prior to feeding to said adder units, each adder unit comprising means for performing parallel binary addition on the binary digits of the respective pair of binary coded decimal digits applied thereto taking into account any carry signal applied thereto, means for applying any carry signal resulting from the binary addition in an adder unit to the next succeeding adder unit, and selectively operable means to which the resulting outputs from said adder units are fed in parallel for selective reconversion of the "excess 6" sum represented thereby, said reconversion means being responsive to carries produced by said adder units.

6. The invention in accordance with claim 5 wherein each adder unit includes a plurality of simultaneously operable binary adder stages wherein each is able to selectively provide an essentially continuous open electrical path therethrough for transmission of an interstage carry signal.

7. A circuit for adding a first number comprised of a plurality of binary coded decimal digits to a second number comprised of a plurality of binary coded decimal digits whereby both the decimal and binary digits are added in parallel, said circuit comprising: a plurality of simultaneously operable adder units, there being one adder unit for each respective pair of binary coded decimal digits to be added, means for applying corresponding pairs of the binary coded decimal digits which are to be added to respective ones of said adder units, means for converting the binary coded decimal digits of one of said numbers to "excess 6" binary coded decimal form prior to feeding to said adder units, each adder unit comprising a plurality of binary adder stages for performing parallel binary addition on the binary digits of the respective pair of binary coded decimal digits applied thereto taking into account any carry input signal applied thereto, carry generation means respectively associated with predetermined ones of said adder units for generating carry input signals, means for applying a signal representing carry information to a plurality of said carry generation means at the same time, and means applying signals to each carry generation means representative of the input binary digits applied to all previous adder units, said plurality of carry generation means being constructed and arranged to combine the inputs applied thereto by the last two mentioned means so as to be able to simultaneously generate a carry input signal for each respective associated adder unit, and selectively operable means to which the resulting outputs from said adder units are fed in parallel for selective reconversion of the "excess 6" sum represented thereby, said reconversion means being responsive to said carry input signals.

8. A circuit for adding a first plurality of coded digits to a second plurality of coded digits wherein each coded digit is comprised of a plurality of binary digits and wherein both the coded and binary digits are to be added in parallel, said circuit comprising: a plurality of simultaneously operable adder units, there being one adder unit for each respective pair of binary coded digits to be added, means for applying corresponding pairs of the coded digits which are to be added to respective ones of said adder units, each adder unit comprising a plurality of binary adder stages for performing parallel binary addition on the binary digits of the respective pair of coded digits applied thereto taking into account any carry input signal applied to the adder unit, means for applying an initial carry signal to a first adder unit, a carry generation means respectively associated with each succeeding adder unit for generating a carry input signal for its respective adder unit, means for applying said initial carry signal directly to each carry generation means, means applying signals to each carry generation means representative of the input binary digits applied to all previous adder units without taking into account said initial carry, each carry generation means being constructed and arranged to combine the inputs applied thereto by the last two mentioned means so as to be able to generate a carry input signal for each respective associated adder unit without having to wait for said initial carry to propagate through any previous stages, and means cooperating with said adder units for causing each carry input signal to properly represent a carry in the particular coding system being employed.

9. A circuit for adding a first plurality of coded digits to a second plurality of coded digits wherein each coded digit is comprised of a plurality of binary digits and wherein both the coded and binary digits are to be added in parallel, said circuit comprising: a plurality of simultaneously operable adder units, there being one adder unit for each respective pair of binary coded digits to be added, means for applying corresponding pairs of the coded digits which are to be added to respective ones of said adder units, each adder unit including first binary adder means having a plurality of simultaneously operable binary adder stages for parallel addition of the respective pair of binary coded digits applied thereto in which the parallel addition is performed independently of any input carry applied to the adder unit, each adder unit also including second binary adder means for parallel addition of the sum of said first binary adder means with a carry input signal applied to the adder unit, means for applying an initial carry to a first adder unit, a carry generation means associated with each succeeding adder unit for generating a carry input signal for its respective adder unit, means for applying to each carry generation means the binary sum output of each of the binary stages of the first binary adder means of all preceding adder units, means for also applying to each carry generation means the carry output of the most significant binary stage of the first adder means of the immediately preceding adder unit, and means for applying said initial carry directly to each carry generation means, each of said carry generation means being constructed and arranged to combine the inputs applied thereto by the last three mentioned means so as to permit a carry input signal to be generated for its respective adder unit simultaneously with the carry input signals generated for the other adder units.

References Cited by the Examiner

UNITED STATES PATENTS

| | | | |
|---|---|---|---|
| 2,705,108 | 3/55 | Stone | 235—169 |
| 2,799,450 | 7/57 | Johnson | 235—176 XR |
| 2,886,241 | 5/59 | Spaulding | 235—154 |
| 2,890,830 | 6/59 | Woods-Hill | 235—169 |
| 2,928,601 | 3/60 | Curtis | 235—169 |
| 2,981,471 | 4/61 | Eachus | 235—169 |
| 2,991,009 | 7/61 | Edwards | 235—169 |
| 3,001,711 | 9/61 | Frohman | 235—176 |
| 3,074,639 | 1/63 | Morgan et al. | 235—175 |
| 3,100,836 | 8/63 | Paul et al. | 235—175 |

MALCOLM A. MORRISON, *Primary Examiner.*

WALTER W. BURNS, Jr., *Examiner.*